United States Patent
Wang et al.

(10) Patent No.: US 10,666,329 B2
(45) Date of Patent: May 26, 2020

(54) METHOD AND DEVICE FOR BEAM FORMING

(71) Applicant: Orange, Paris (FR)

(72) Inventors: Xiaoyu Wang, Beijing (CN); Jie Mei, Beijing (CN); Kan Zheng, Beijing (CN)

(73) Assignee: Orange, Paris (FR)

( * ) Notice: Subject to any disclaimer, the term of this patent is extended or adjusted under 35 U.S.C. 154(b) by 60 days.

(21) Appl. No.: 15/385,839

(22) Filed: Dec. 20, 2016

(65) Prior Publication Data

US 2017/0180021 A1    Jun. 22, 2017

(30) Foreign Application Priority Data

Dec. 21, 2015 (WO) ................ PCT/CN2015/098047

(51) Int. Cl.
*H04B 7/0456* (2017.01)
*H04B 7/06* (2006.01)
*H04B 17/309* (2015.01)

(52) U.S. Cl.
CPC ......... *H04B 7/0456* (2013.01); *H04B 7/0465* (2013.01); *H04B 7/065* (2013.01); *H04B 17/309* (2015.01)

(58) Field of Classification Search
None
See application file for complete search history.

(56) References Cited

U.S. PATENT DOCUMENTS 8,451,928 B2 * 5/2013 Agee .................... H04B 7/0413
                                                                375/267
8,711,716 B2 * 4/2014 Chen ...................... H04B 7/024
                                                                370/252

(Continued)

FOREIGN PATENT DOCUMENTS

CN    102624496 A    8/2012
CN    104065448 A    9/2014

(Continued)

OTHER PUBLICATIONS

Oostnejad, Roya. Precoding and Beamforming for Multi-Input Multi-Output Downlink Channels. Doctor of Philosophy Thesis, Dec. 31, 2005, The Edward S. Rogers, Sr. Department of Electrical and Computer Engineering, University of Toronto, 157 pages. Cited in the Applicant's IDS submitted on Jan. 16, 2017.*

(Continued)

*Primary Examiner* — Berhanu Tadese
(74) *Attorney, Agent, or Firm* — Knobbe, Martens, Olson & Bear, LLP

(57) ABSTRACT

A method and a network system capable of enhanced transmission of data signals in a multiple-input multiple-output (MIMO) communication system using a double-layer coordinated beamforming are disclosed. A first layer precoding matrix is obtained from long-term channel state information between user equipment and network equipment, and a second layer precoding matrix obtained from the first layer precoding matrix and from real-time channel state information between the user equipment and the network equipment. The real-time channel state information for the second layer precoding matrix determination includes a predetermined signal-to-interference-plus-noise ratio (SINR), and/or a predetermined power value associated with a single antenna of the user equipment, which are used as optimization parameters. The first and second layer precod- (Continued)

Figure 1:
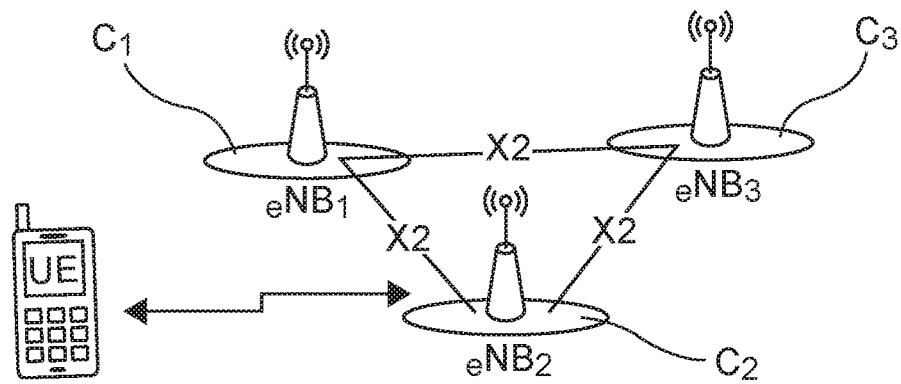

ing matrices are combined for the double-layer coordinated beamforming. The present disclosure allows to enhance the coordinated beamforming of the prior art by adding some constraints during the optimization of the second layer precoding.

9 Claims, 4 Drawing Sheets

(56) References Cited

U.S. PATENT DOCUMENTS

| | | | | |
|---|---|---|---|---|
| 8,750,205 | B2* | 6/2014 | Chen | H04B 7/024 370/328 |
| 8,804,563 | B2* | 8/2014 | Hu | H04L 25/022 370/252 |
| 9,137,818 | B2* | 9/2015 | Tulino | H04W 72/1273 |
| 9,252,856 | B2* | 2/2016 | Wang | H04B 7/0486 |
| 9,319,118 | B2* | 4/2016 | Zhu | H04B 7/0452 |
| 9,351,293 | B2* | 5/2016 | Chen | H04L 5/001 |
| 9,559,828 | B2* | 1/2017 | Chen | H04B 7/024 |
| 9,629,167 | B2* | 4/2017 | Roh | H04L 1/0003 |
| 9,674,846 | B2* | 6/2017 | Wang | H04B 7/024 |
| 9,762,372 | B2* | 9/2017 | Ekpenyong | H04L 1/0031 |
| 9,793,971 | B2* | 10/2017 | Ko | H04B 7/0456 |
| 9,813,133 | B2* | 11/2017 | Ko | H04B 7/0456 |
| 9,866,303 | B2* | 1/2018 | Ko | H04B 7/0456 |
| 9,954,592 | B2* | 4/2018 | Ko | H04B 7/0456 |
| 2010/0303034 | A1* | 12/2010 | Chen | H04L 5/0023 370/329 |
| 2010/0322176 | A1* | 12/2010 | Chen | H04B 7/024 370/329 |
| 2010/0323684 | A1* | 12/2010 | Cai | H04B 7/2606 455/422.1 |
| 2011/0032839 | A1* | 2/2011 | Chen | H04B 7/024 370/252 |
| 2011/0070845 | A1* | 3/2011 | Chen | H04L 5/001 455/91 |
| 2011/0305161 | A1* | 12/2011 | Ekpenyong | H04L 1/0031 370/252 |
| 2012/0182895 | A1* | 7/2012 | Jwa | H04W 72/046 370/252 |
| 2012/0224648 | A1* | 9/2012 | Kim, II | H04B 7/0617 375/260 |
| 2012/0236752 | A1* | 9/2012 | Hu | H04L 25/022 370/252 |
| 2013/0243110 | A1* | 9/2013 | Skov | H04B 7/0408 375/267 |
| 2013/0331136 | A1* | 12/2013 | Yang | H04B 7/024 455/501 |
| 2014/0010197 | A1* | 1/2014 | Wang | H04J 11/0033 370/329 |
| 2014/0233498 | A1* | 8/2014 | Chen | H04B 7/024 370/329 |
| 2014/0269395 | A1* | 9/2014 | Chen | H04B 7/024 370/252 |
| 2014/0286202 | A1* | 9/2014 | Song | H04B 7/0604 370/278 |
| 2014/0341119 | A1* | 11/2014 | Wang | H04B 7/0486 370/329 |
| 2015/0063254 | A1 | 3/2015 | Yue et al. | |
| 2015/0173090 | A1* | 6/2015 | Wang | H04B 7/024 370/329 |
| 2015/0372740 | A1* | 12/2015 | Ko | H04B 7/0456 370/329 |
| 2015/0381247 | A1* | 12/2015 | Ko | H04B 7/0456 370/329 |
| 2015/0382223 | A1* | 12/2015 | Ko | H04B 7/0456 370/252 |
| 2016/0036511 | A1* | 2/2016 | Ko | H04B 7/0456 370/252 |
| 2016/0095127 | A1* | 3/2016 | Roh | H04L 1/0003 370/330 |
| 2017/0019161 | A1* | 1/2017 | Wang | H04B 7/0617 |
| 2017/0180021 | A1* | 6/2017 | Wang | H04B 17/309 |
| 2017/0373817 | A1* | 12/2017 | Ekpenyong | H04L 1/0031 |
| 2018/0248592 | A1* | 8/2018 | Ashrafi | H04L 5/0057 |

FOREIGN PATENT DOCUMENTS

| | | | | |
|---|---|---|---|---|
| EP | 3185434 A1 * | 6/2017 | | H04B 17/309 |
| WO | WO 2012/045143 A1 | 4/2012 | | |
| WO | WO 2014182550 A1 * | 11/2014 | | H04B 15/02 |
| WO | WO-2014182550 A1 * | 11/2014 | | H04K 3/00 |
| WO | WO 2015/033661 A1 | 3/2015 | | |
| WO | WO 2015/094661 A1 | 6/2015 | | |
| WO | WO 2015094661 A1 * | 6/2015 | | H04B 7/0639 |
| WO | WO-2015094661 A1 * | 6/2015 | | H04B 7/0626 |
| WO | WO-2017107002 A1 * | 6/2017 | | H04B 7/0465 |

OTHER PUBLICATIONS

Liu, et al. Sep. 2014. Hierarchical Interference Mitigation for Massive MIMO Cellular Networks, IEEE Transactions on Signal Processing, 62(18):4786-4797. Cited in the Applicant's IDS submitted on Jan. 16, 2017.*
International Search Report and Written Opinion of the International Searching Authority dated Sep. 8, 2016 for International Applicatn No. PCT/CN2015/098047 filed Dec. 21, 2015, 157 pages. Cited in the applicant's IDS submitted on Jan. 16, 2017.*
Liu, et al. Jun. 2015.Two-Stage Subspace Constrained Precoding in Massive MIMO Cellular Systems, IEEE Transactions on Wireless Communications, 14(6):3271-3279. Cited in the Applicat's IDS submitted on Jan. 16, 2017.*
H. Dahrouj and W. Yu, Coordinated beamforming for the multi-cell multi-antenna wireless system, IEEE, 2008 (Cited in the IDS of Jan. 16, 2017).*
A. Liu et al., Two-Stage Subspace Constrained Precoding in Massive MIMO Cellular Systems, in IEEE Transactions on Wireless Communications, vol. 14, No. 6, pp. 3271-3279, Jun. 2015 (Cited in the IDS of Jan. 16, 2017).*
A. Liu et al., Hierarchical Interference Mitigation for Massive MIMO Cellular Networks, in IEEE Transactions on Signal Processing, vol. 62, No. 18, pp. 4786-4797, Sep. 15, 2014 (Cited in the IDS of Jan. 16, 2017).*
Doostnejad, Roya. Precoding and Beamforming for Multi-Input Multi-Output Downlink Channels. Doctor of Philosophy Thesis, Dec. 31, 2005, The Edward S. Rogers, Sr. Department of Electrical and Computer Engineering, University of Toronto, 157 pages.
Liu, et al. Sep. 2014. Hierarchical Interference Mitigation for Massive MIMO Cellular Networks, *IEEE Transactions on Signal Processing*, 62(18):4786-4797.
Liu, et al. Jun. 2015.Two-Stage Subspace Constrained Precoding in Massive MIMO Cellular Systems, *IEEE Transactions on Wireless Communications*, 14(6):3271-3279.
International Search Report and Written Opinion of the International Searching Authority dated Sep. 8, 2016 for International Applicatn No. PCT/CN2015/098047 filed Dec. 21, 2015, 157 pages.
Boche, H. et al: "A General Duality Theory for Uplink and Downlink Beamforming", VTC 2002-Fall. 2002 IEEE 56th. Vehicular Technology Conference Proceedings. Vancouver, Canada. 24-8, 2002; [IEEE Vehicular Technolgy Conference], New York, NY : IEEE, US, vol. I, Sep. 24, 2002 (Sep. 24, 2002), pp. 87-91.
European Search Report received in Application No. EP 16200601.9 dated May 2, 2017.
Communication pursuant to Article 94(3) EPC of the European Patent Office dated Feb. 1, 2019 for European Application No. EP16 200 601.9-1220 in 7 pages.

* cited by examiner

METHOD AND DEVICE FOR BEAM FORMING

RELATED APPLICATIONS

This application claims priority to PCT/CN2015/098047 entitled "METHOD AND DEVICE FOR BEAMFORMING" filed Dec. 21, 2015, the disclosure of which is incorporated herein by reference in its entirety.

1. TECHNICAL FIELD

The present disclosure relates to wireless communication systems, and more particularly to the precoding of data to be transmitted in a Multiple-input Multiple-output (MIMO) wireless communication system. More precisely, the present disclosure aims at providing a precoding solution for very large MIMO systems known as "Massive MIMO systems".

2. BACKGROUND ART

Massive Multiple-Input and Multiple-Output (MIMO) technology has attracted much attention in wireless communications, because it offers significant increases in data throughput and link range without an additional increase in bandwidth or transmit power. Both theoretical and measurement results indicate that massive MIMO is capable of significantly improving the Spectrum Efficiency, while simultaneously improving energy efficiency.

In Massive MIMO systems (also known as Large-Scale Antenna Systems, Very Large MIMO, Hyper MIMO, Full-Dimension MIMO and ARGOS) a base station is equipped with a very large number of antennas (e.g., hundreds or thousands) that are operated fully coherently and adaptively according to a multi-user MIMO scheme.

Considering such a multi-user MIMO scheme where a plurality of users are respectively located in a plurality of cells of a communication network, inter-cell interference (ICI) and intra-cell interferences degrades the performance of massive MIMO system.

The reduction of inter-cell interference (ICI) can be achieved by using properly configured precoders at the transmitter side (i.e. at the side of at least one base station), in other words by choosing carefully beamforming vectors, or precoding weights, before the transmission of the signal to multiple users.

Among the known beamforming techniques, the coordinated beamforming (CBF) requires only a modest amount of signaling overhead and, for the sake of implementation, is classically proposed to improve system performance.

Different structures of coordinated beamforming can be implemented. In particular, a hierarchical structure of coordinated beamforming is disclosed by A. Liu in "Hierarchical interference mitigation for massive MIMO cellular networks", IEEE Trans. Signal Process., vol 62, no.18, pp. 4786-4797, September 2014.

More precisely, according to such a structure, explicitly, each evolved Node B (eNB) consists of two layers: on the one hand a first precoder, called a "cell-layer precoder" in the following of the disclosure, and a second precoder, called a "user-layer precoder" on the other hand.

In general, as disclosed by A. Liu in "*Two-stage subspace constrained precoding in massive MIMO cellular systems*", IEEE Trans. Wireless Commun., vol 14, no. 6, pp. 3271-3279, June 2015, the user-layer precoder supports data transmission to the active user terminal (UEs) by exploiting the knowledge of the time-variant channel state information (CSI). As far as the cell-layer precoder is concerns, it exploits the remaining spatial degree of freedom for mitigating the ICI by relying only on the knowledge of the long-term variant channel state information (CSI).

Although coordinated beamforming (CBF) relying on hierarchical structure needs little signal backhaul overhead, there are two main drawbacks of the existing coordinated beamforming hierarchical-structure: on the one hand, these existing schemes of the prior art are not suitable for implementation in practical massive MIMO system. Indeed, in the existing hierarchical-structure coordinated beamforming schemes, clusters of user equipments (UEs) are formed, and user equipments (UEs) in the same cluster have the same long-term channel state information (CSI), which is impractical.

On the other hand, although the cell-layer precoder of existing hierarchical-structure coordinated beamforming (CBF) schemes is adjusted to reduce Inter-Cell Interference with low complexity, the user-layer precoder of the prior art is settled as ZF precoder, and considers power allocation issue in precoding, which may result in more intra-cell interference.

Therefore, there is a need for an alternative precoding scheme, which overcomes the drawbacks of the above-mentioned method and can offer improved performances in terms of power consumption of all evolved Node B (eNB).

3. SUMMARY OF THE INVENTION

It is an object of the present disclosure to overcome disadvantages and/or make improvement over the prior art.

To that extent, the present disclosure proposes a method for transmitting a signal carrying data from a network equipment to a user equipment in a multiple input-multiple output (MIMO) communication system, said method optimizing the beamforming approach for the precoding scheme.

The method comprises applying a double-layer coordinated beamforming of the data prior to their transmission to the user equipment; the double-layer coordinated beamforming comprising:
  receiving a first layer precoding matrix obtained at least from long-term channel state information between the user equipment and the network equipment, and
  determining a second layer precoding matrix obtained from the first layer precoding matrix and from real-time channel state information between the user equipment and
  obtaining the double-layer coordinated beamforming by combining the first layer precoding matrix and the second layer precoding matrix, Such determining of the second layer precoding matrix is optimized by using a predetermined signal-to-interference-plus-noise ratio of the signal, and/or a predetermined power value associated with a single antenna of the user equipment, as optimization parameters.

The present disclosure thus relies on a novel and inventive approach for beamforming by proposing a double layer coordinated beamforming minimizing the total power consumption of the considered network equipment (corresponding to an evolve node B or more generally a base station BS), while guaranteeing the required data rate of each User Equipment and satisfying the power constraint of single antenna.

More precisely, the present disclosure permits essentially to enhance the coordinated beamforming of the prior art by adding some constraints during the optimization of the second layer precoding.

In the following, the expression "first layer precoding" is called "cell-layer precoding" whereas "second layer precoding" is called "user-layer precoding".

On the one hand, the cell-layer precoding is adjusted to reduce the Inter-cell Interference In comparison with the prior art the cell-layer precoding obtained by the network equipment according to the present disclosure is not use to settle the user-layer precoding as a ZF precoder.

Indeed, according to the present disclosure, the provided cell-layer precoding is used in combination with the value of the targeted signal-to interference-plus-noise ratio and/or with the power of the single antenna of a user equipment depending on the considered network equipment, for optimising the user-layer precoding.

In other words, at least one constraint is additionally directly taken into account as a parameter for obtaining at least one user-layer precoding vector of second layer precoding matrix called user-layer precoding matrix in the following.

Taking into account such at least one additional parameter certainly represents a constraint but permits to avoid the clustering of user equipments and the required transmission of data information of a target user equipment shared among the network equipments of same cluster, which consumes overwhelming overhead resources compared to the proposed coordinated beamforming scheme of the present disclosure.

As a consequence, the proposed scheme significantly increases the signal-to-interference-plus-noise ratio of cell-edge user equipment and reduces the system energy efficiency with low signalling overhead compared with the techniques of the prior art corresponding to the ZF and cluster coordinated multi-point (CoMP) schemes.

According to a particular aspect of the present disclosure, the real-time channel state information is obtained at each time slot.

In an embodiment of the present disclosure, the determining of the second layer precoding matrix is iterative until convergence and comprises for each iteration:
  with a fixed value of a first Lagrange multiplier associated with the second layer precoding matrix, using the predetermined signal-to-interference-plus-noise ratio for optimizing a second layer Lagrange multiplier associated with the second layer precoding,
  from the second layer Lagrange multiplier associated with the second layer precoding, obtaining at least one vector associated with the second layer precoding matrix, using the at least one vector associated with the second layer precoding matrix and the predetermined power value associated with a single antenna of the user equipment for determining, for the next iteration, a value of the first Lagrange multiplier associated with the second layer precoding.

In other words, according to the embodiments, the optimizing implements an iterative algorithm based on the use of two Lagrange multipliers, which are respectively optimized using on the one hand the predetermined signal-to-interference-plus-noise ratio, and on the other hand the predetermined power value. Thus, this embodiment is based on the application of two constraints for optimizing two distinct Lagrange multipliers permitting to obtain an associated optimal user-layer precoding vector.

According to a particular aspect of the embodiment, the value of the first Lagrange multiplier associated with the second layer precoding is determined by using a second layer precoding sub-gradient projection.

The present disclosure further proposes a network equipment for transmitting a signal carrying data to a user equipment in a multiple-input multiple-output communication system, the network equipment being adapted to perform a double-layer coordinated beamforming of the data prior to their transmission to the user equipment; the network equipment comprising:
  a receiver, connected to a plurality of antennas, and configured to receive a first layer precoding matrix obtained from long-term channel state information between the user equipment and the network equipment, and
  a precoding module, connected to the receiver, and configured to determine a second layer precoding matrix obtained from the first layer precoding matrix and from real-time channel state information between the user equipment and the network equipment,
  a double-layer coordinated beamforming module, connected to the receiver and to the precoding module, configured to combine the first layer precoding matrix and the second layer precoding matrix.

In such a network equipment, the double-layer coordinated beamforming module, determining the second layer precoding matrix, is optimized by using a predetermined signal-to-interference-plus-noise ratio of the signal, and/or a predetermined power value associated with a single antenna of the user equipment, as optimization parameters.

Such a network equipment corresponding to an evolved Node B or more generally a base station, is particularly adapted to implement the method for transmitting a signal carrying data from a network equipment to a user equipment in a multiple-input multiple-output communication system as described above.

Such a network equipment could of course comprise the different characteristics pertaining to the method of for transmitting a signal carrying data from a network equipment to a user equipment in a multiple-input multiple-output communication system. Thus, the features and advantages of this network equipment are the same as those of the method of for transmitting a signal carrying data from a network equipment to a user equipment in a multiple-input multiple-output communication system according to the present application, and is not described in more detail.

The disclosure further relates to a multiple-input multiple-output communication system comprising:
  at least one network equipment according as described above,
  at least one user equipment comprising a single antenna,
  a central equipment configured to determine a first layer precoding matrix (F) from at least long-term channel state information between the at least one user equipment and the at least one network equipment.

Such a user equipment is for example a mobile phone, and the central equipment is for example an evolved Node B selected among the other evolved Nodes B of a network comprising a plurality of cells.

More precisely, according to a particular aspect of this embodiment, the central equipment comprises a module for obtaining iteratively the first layer precoding matrix, the module for obtaining comprising the following means implemented for each iteration:
  means for determining at least one eigen-vector of the first layer precoding matrix, from the long-term channel state information and two first layer precoding Lagrange, and for determining a value for each of the two first layer precoding Lagrange for the next iteration, the means for determining being implemented until convergence, means for determining at least one threshold value for the next iteration, said means for determining being implemented once convergence is reached, means for comparing the at least one threshold value with a value representing a tolerable error.

According to a particular feature of this embodiment, the means for determining a value for each of the two first layer precoding Lagrange multipliers for the next iteration comprises means for performing a first layer precoding subgradient projection obtaining simultaneously the two first layer precoding Lagrange multipliers.

According to another particular feature of this embodiment, the central equipment comprises means for initializing the threshold as a mean of a lower bound and an upper bound of inter-cell interference, said upper bound being proportional to a predetermined power value Pant associated with a single antenna of said user equipment UE.

Indeed, the object of the present disclosure uses the expression of the inter-cell interference and of the signal-to-interference-plus-noise ratio to optimize the proposed double-layer coordinated beamforming. Such a use imposes vast overhead among the network equipments of the considered massive MIMO system. Setting the upper bound, of the threshold used during the obtaining of the first layer precoding, as being proportional to a predetermined power value associated with a single antenna of said user equipment permits to overcome such a vast overhead.

The disclosure also relates to computer program comprising instruction codes for implementing the method for transmitting a signal carrying data according to present disclosure, when loaded and run on processing means of a network equipment.

Such a computer program is a non-transitory computer-readable medium.

Although examples of the invention have been described hereinabove in relation with a limited number of embodiments, those skilled in the art, when reading this description, will understand that other embodiments can be imagined without leaving the scope of this invention.

In particular, while not explicitly described, the present embodiments may be employed in any combination or sub-combination.

Accordingly, aspects of the present principles can take the form of an entirely hardware embodiment, an entirely software embodiment, or an embodiment combining software and hardware aspects. Furthermore, aspects of the present principles can take the form of a computer readable storage medium. Any combination of one or more computer readable storage medium(s) may be utilized.

4. BRIEF DESCRIPTION OF THE DRAWINGS

Figure 2:
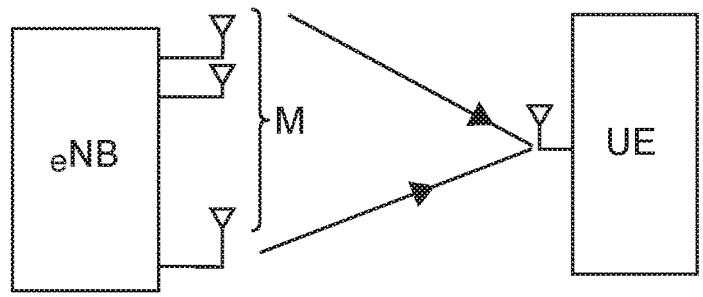
Figure 3A:
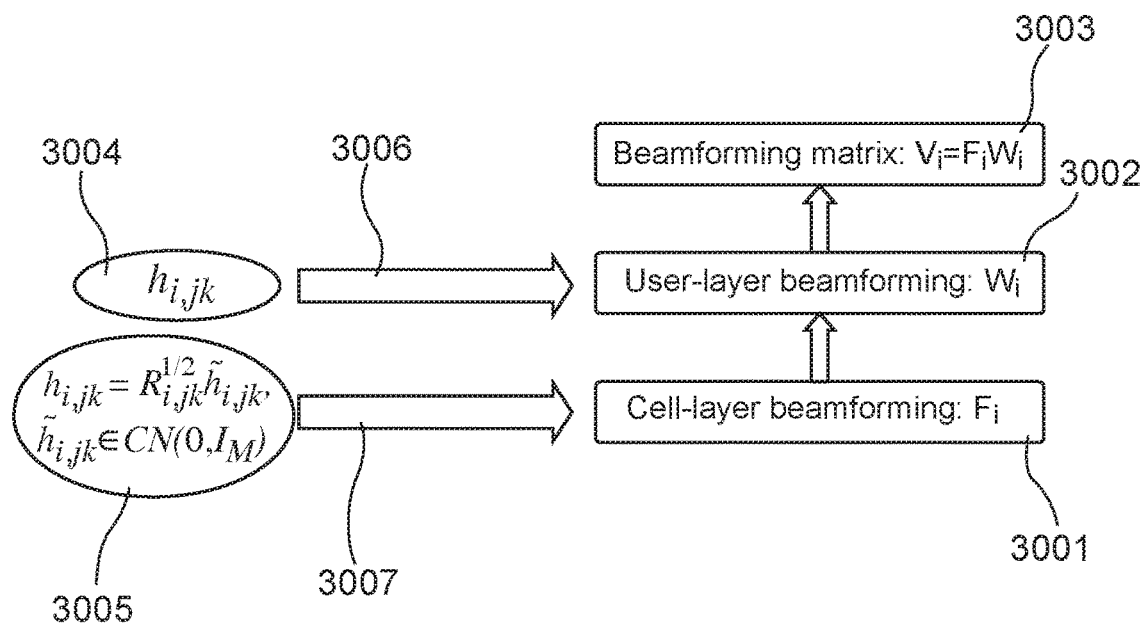
Figure 3B:
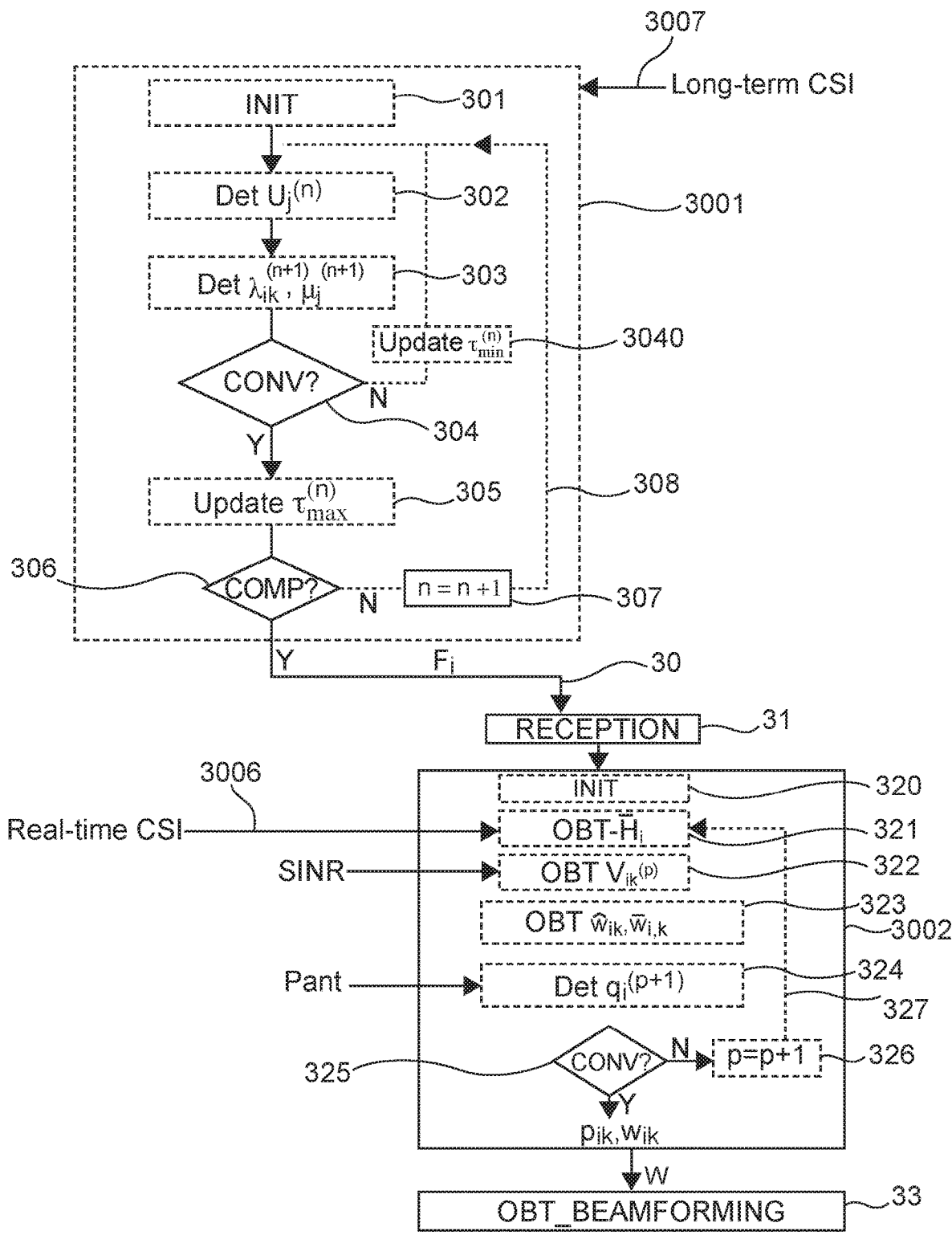
Figure 5:
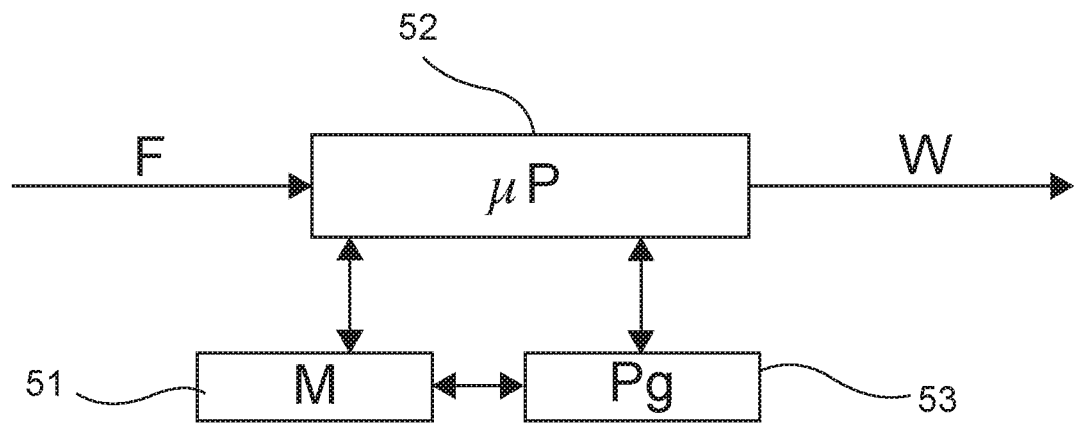
Figure 4A:
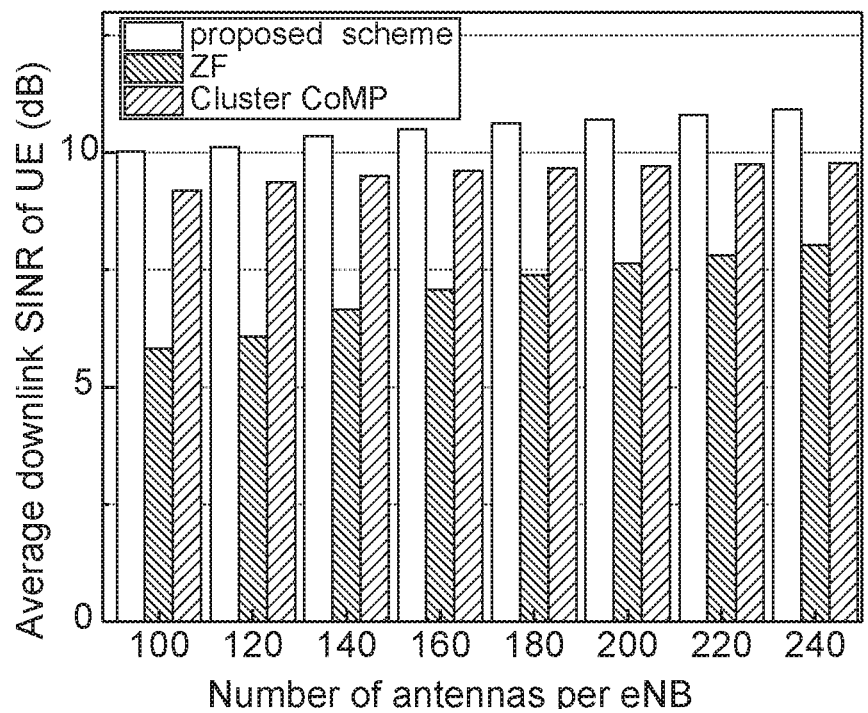
Figure 4B:
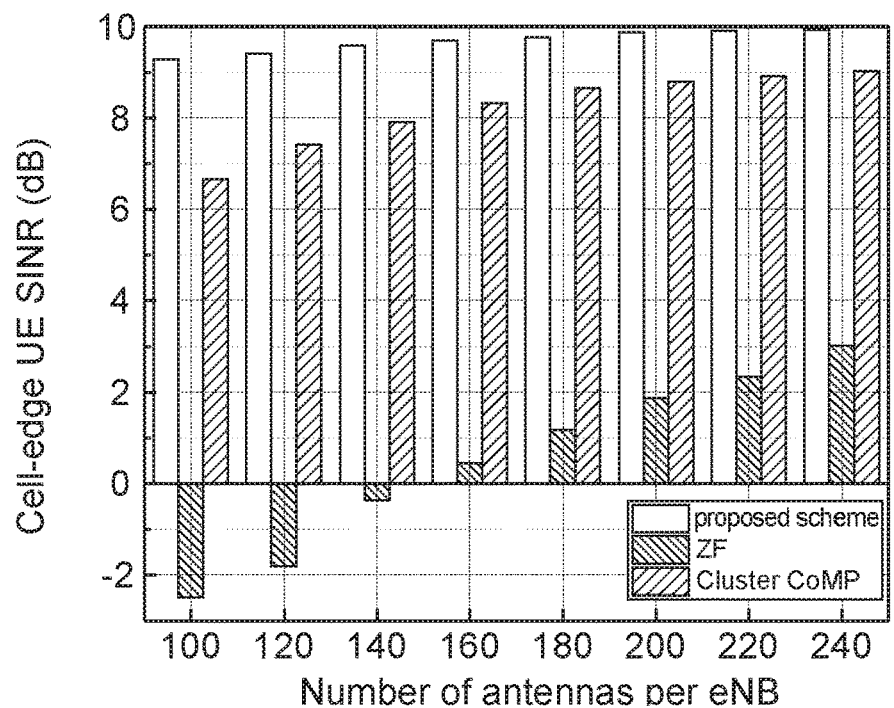
Figure 4C:
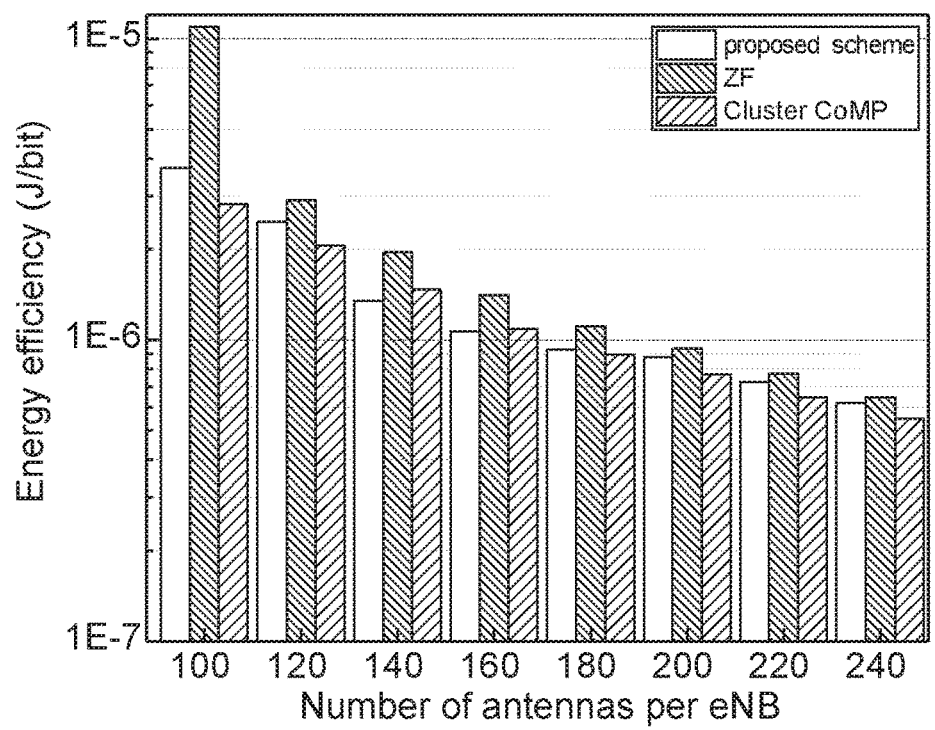

Other features and advantages of the invention will become apparent from the following description of non-limiting exemplary embodiments, with reference to the appended drawings, in which:

FIG. 1 represents a simplified communication system, which illustrates the principle of the invention, FIG. 2 represents the vector transmission channel established between a network equipment and a user equipment, FIGS. 3A and 3B illustrate the steps of the method for transmitting a signal carrying data that is subject of the present invention, FIG. 4A to 4C represent a comparison between the results obtained according to the present disclosure and the results obtained using the prior art techniques, FIG. 5 represents a network equipment capable of running the method of transmission of the present disclosure.

5. DETAILED DESCRIPTION

5.1 General Principle

The general principle of the present disclosure consists in a new way of beamforming a signal carrying data implemented by a network equipment prior to its transmission to a user equipment, by applying a double-layer coordinated beamforming whose second layer is optimized, in a network equipment associated with a cell, according to the present disclosure by taking into account the result provided by the first layer and by taking into account at least one constraint among a predetermined signal-to-interference-plus-noise ratio of said signal, and/or a predetermined power value associated with a single antenna of a user equipment.

Various non-limiting embodiments of beamforming method, corresponding device, communication system computer program and computer-readable storage medium for beamforming are disclosed in the next sections.

This disclosure may, however, be embodied in many alternate forms and should not be construed as limited to the embodiments set forth herein.

5.2 the Transmitting Method

5.2.1 Application Environment and Main Steps of the Transmitting Method

The application environment of the transmitting method according to the present disclosure is illustrated by FIG. 1. More precisely, a multi-user system is considered in a multi-cell scenario.

In the following, in such a scenario L cells are considered in the network (in FIG. 1, for simplicity L=3 which corresponds to cells $C_1$, $C_2$, and $C_3$, but a higher number of cells can obviously be taken into account since a massive MIMO communication system is considered in the present disclosure).

In each cell ($C_1$, $C_2$, $C_3$) is settled one network equipment corresponding to a base station, which is for example an evolved Node B ($eNB_1$, $eNB_2$, $eNB_3$).

In addition, K User Equipments (UEs) are served by each of the L cells (for simplicity, only one User Equipment (UE) is however represented on FIG. 1).

More precisely, as illustrated by FIG. 2 representing the vector transmission channel established between a network equipment and a user equipment, it can be seen that each eNB, comprises M antennas, and is able to provide a peak power $P_T = M \times P_{ant}$.

Moreover, each user equipment (UE) comprises a single antenna whose maximum power is $P_{ant}$.

In the following the general notations hereafter are used:
the operators $(.)^H$ and $tr(.)$ denote respectively conjugate transpose and trace,
the operators $(.)^T$ denotes a matrix transposition, transforming row vector to column vector,
the operator $(.)^+$ is such that $$(x)^+ = \begin{cases} x, & \text{if } x \geq 0 \\ 0, & \text{if } x < 0 \end{cases}$$

the operator diag(a) represents a diagonal matrix whose diagonal elements are the elements of vector a, $I_N$ represents an identity matrix of size N, C denotes the set of all complex numbers, $U^{M \times N}$ denotes the set of all M×N semi-unitary matrices, which satisfies $U^H U = I_N$, $[A]_{m,n}$ denotes the (m,n)-th entry of a matrix A, $h_{i,jk} \in C^{M \times 1}$ is a channel coefficient vector from a network equipment (eNB) of the i-th cell among the L cells (i.e. i=1, 2, ... L) to the k-th User Equipment in the j-th cell modelled as $h_{i,j} = R_{i,jk}^{1/2} \widetilde{h}_{i,jk}$, with:

$\widetilde{h}_{i,jk} \in C^{M \times 1}$ having independent identically distributed complex entries with zero mean and variance one, and $R_{i,jk} = E[h_{i,jk} h_{i,jk}^H] \in C^{M \times M}$ is a deterministic Hermitian-symmetric positive definite matrix, where "E" means expectation operation.

FIG. 3A illustrates the main steps of the transmitting method according to the present disclosure. Such a method corresponds to a double-layer precoding wherein, when considering the i-th cell among the set of L involved cell, a first layer precoding matrix $F_i$ is first provided by a first precoding layer called "Cell-layer beamforming" 3001, and a second layer precoding matrix $W_i$ is provided by a second precoding layer called "User-layer beamforming" 3002 and is used for serving the user equipments in a same cell i.

In other words, for each eNB i, the beamforming matrix $V_i$, is partitioned into:

a cell-layer beamforming precoding matrix 3001 $F_i$ provided by a central equipment of the considered communication system, and a user-layer beamforming precoding matrix $W_i$ 3002 provided by the eNB i itself.

These two precoding matrices being then combined such as: $V_i = F_i W_i$.

The cell-layer precoder obtained by a central node for all eNB, is used to obtain the spatial multiplexing gain for mitigating inter-cell interference (ICI) among cells. Meanwhile, the user-layer precoder supports the data transmission by exploiting the local instantaneous channel state information in each cell.

Each precoding stage is detailed hereafter.

5.2.2 Cell-Layer Beamforming Precoding

It has to be noted that one of the network equipments (i.e. eNB) of the massive MIMO communication system is classically chosen as a central equip (i.e. central controller) to perform the Cell-layer precoding 3001 as represented in dotted lines in FIG. 3B.

Then, for each considered i-th cell (i.e. i=1, 2, ... L):

each k-th user equipment, of a j-th adjacent cell interfered by one network equipment (eNB) of the considered i-th cell, transmits in selected time slots dedicated pilot sequences to the network equipment of which it depends (i.e. a network equipment of the j-th adjacent cell), said network equipment of the j-th adjacent cell estimates the corresponding spatial correlation matrix $R_{i,jk}$ of the communication channel between the considered k-th user equipment in the j-th cell and the i-th cell. In other words, said spatial correlation matrix represents long-term channel state information (long-term CSI) 3005 between each adjacent cell user interfered by the i-th cell, once such long-term CSI 3005 is obtained for each adjacent cell user equipment interfered by the i-th cell, the network equipments, on which these user equipment respectively depend, send (3007) the long-term CSI to the central node through X2 interface.

It has to be noted that compared to conventional CBF or joint processing schemes, each network equipment (i.e. eNB) of the scheme according to the present disclosure only need to sens spatial correlation matrices of User equipments to the central node, which significantly reduces channel state information signalling overhead.

The central node thus acquires (3007) all the corresponding spatial correlation matrices $R_{j,jk}$ for i=1, 2, ... L, considering that for a considered i-th cell $R_{i,jk}$ matrices are obtained for j≠i and j=1, 2, ... L and for k=1, 2, ... K.

It has to be noted that the corresponding spatial correlation matrices $R_{i,jk}$ of channel vectors, by nature, change slower than the real-time channel state information (CSI). Such a property, permits to the central equipment to acquire the long-term CSI and to perform the cell-layer beamforming precoding in a long timescale in comparison with the real-time CSI acquisition and the user-layer beamforming precoding, which are then implemented on a considered eNB of a i-th cell and detailed in the following.

As illustrated by FIG. 3B, said central equipment comprises a module for obtaining iteratively first layer precoding matrices for each involved eNB. In other words, said central equipment delivers a vector F of L first layer precoding matrices for all L cells such that: $F = \{F_1 \ldots F_i \ldots F_L\}$, i.e. one matrix per cell.

More precisely, said module for obtaining comprising the following means implemented for each iteration:

means for determining (302) at least one eigen-vector of said first layer precoding matrix, from said long-term channel state information ($R_{i,jk} | \forall i, j, k$) and two first layer precoding Lagrange multipliers ($\lambda, \mu$), and for determining (303) a value for each of said two first layer precoding Lagrange multipliers ($\lambda, \mu$) for the next iteration, said means for determining being implemented until convergence (304), means for determining (305) at least one threshold value for the next iteration, said means for updating being implemented once convergence is reached, means for comparing (306) said at least one threshold value with a value representing a tolerable error.

Before running said module for obtaining a step of initialization (301) is implemented wherein n, the number of iterations, is set to zero (n=0) and wherein two threshold values, corresponding to two threshold bounds $\tau_{min}^{(n=0)}$ and $\tau_{max}^{(n=0)}$, used for ending the processing, are set respectively to predetermined values such as for example: $\tau_{min}^{(n=0)}$ and $\tau_{max}^{(n=0)} = \max_{i,j,k} \{P_T \text{tr}(R_{i,jk})\}$ and satisfy $\tau_{max}^{(n=0)} \tau_{min}^{(n=0)}$.

Such initialization of the obtaining the cell-layer beamforming matrix according to the present disclosure is used to limit the overhead among eNBs managed by said central equipment when mitigating the inter-cell interference of each eNB with the cell-layer precoding.

In other words, considering, for example, $G_{j,ik}$ the cell interference from the j-th eNB to the k-th user equipment in the i-th cell, after the cell-layer precoding performed by the central node, the "effective channel" of each cell is nearly orthogonal, which can be denoted as $\max_{\forall i,k} \{\sum_{j=1, \neq i}^{L} G_{j,ik}\} \leftarrow 0$.

To this end, the cell layer precoder is obtained by solving the following problem as implemented by the obtaining module of the central node:

$$\min_F \max_{\forall i,k} \{\sum_{j=1,\neq i}^{L} \widehat{G_{j,ik}}\} \text{ subject to constraint}$$

$tr(F_j F_j^H) \geq \alpha K, \forall j$ where $\widehat{G_{j,ik}}$ is an approximation of $G_{j,ik}$.

According to the present disclosure, the epigraph form of this problem is expressed as:

$$\min_X \tau \text{ such that } \sum_{j=1,\neq i}^{L} \widehat{G_{j,(ik)}} = P_T \sum_{j=1,\neq i}^{L} tr(R_{i,jk} X_j)$$
$\leq \tau, \forall i,k$ and $tr(X_j) \geq \alpha K, \forall j$ where
$X_j = F_j F_j^H \in C^{M \times M}$ and $X = \{X_1, \ldots, X_K\}$.

Such an epigraph form of problem with fixed r is a convex problem and a bisection method to find optimal $\tau^*$ of $\tau$ can then be used.

As a consequence, $\tau_{min}^{(n=0)}=0$ and $\tau_{max}^{(n=0)}=\max_{i,j,k}\{P_T tr(R_{i,jk})\}$ are respectively a lower bound and an upper bound of $\max_{\forall i,k}\{\sum_{j=1,\neq i}^{L} \widehat{G_{j,ik}}\}$.

Once, the lower and upper bound are initialized as described above, the corresponding threshold $\tau^{(n)}$ is obtained such as $\tau^{(n)} = \frac{1}{2}(\tau_{min}^{(n)} + \tau_{max}^{(n)})$ and determining (302) at least one eigen-vector $U_j^{(n)}$ of said first layer precoding matrix is performed.

More precisely, said at least one eigen-vector $U_j^{(n)}$ corresponds to the negative eigenvalues of the matrix $A_j^{(n)}$, where:

$A_j^{(n)} = \sum_{i=1,\neq j}^{L} \sum_{k=1}^{K} P_T \lambda_{ik}^{(n)} R_{i,jk} - \mu_j^{(n)} I_M, j=1,2,\ldots,L$,
and where $\lambda_{ik}^{(n)}(\lambda_{ik}^{(0)}=1)$ and $\mu_j^{(n)}(\mu_j^{(0)}=1)$ are Lagrange multipliers.

Then a value for each of said two first layer precoding Lagrange multipliers $(\lambda,\mu)$ is determined (303) for the next iteration by considering $X_j^{(n)} = U_j^{(n)}(U_j^{(n)})^H$ and using a subgradient projection method with a step size $\theta^{(n)}$:

$$\lambda_{ik}^{(n+1)} = \left(\lambda_{ik}^{(n)} + \theta^{(n)} \cdot \left[P_T \sum_{j=1,\neq i}^{L} tr(R_{j,ik} X_j^*) - \tau^{(n)}\right]\right)^+, \forall i,k,$$

$\mu_j^{(n+1)} = (\mu_j^{(n)} - \theta^{(n)} \cdot [rt(X^*_j) - \alpha K])^+$, $\forall j$ where $\alpha$ is a constant and satisfies $K \leq \alpha K < M$ and ensures that after cell-layer precoding the eNBs still have enough degree of spatial freedom for serving a user equipment.

These two steps 302 and 303 are implemented until convergence 304 (the "Y" and "N" in FIG. 3B represent respectively that convergence is achieved or not).

More precisely, $|\lambda_{ik}^{(n+1)} - \lambda_{ik}^{(n)}| \leq e$ and $|\mu_j^{(n+1)} - \lambda_j^{(n)}| \leq e$, where $i,j=1,2,\ldots,L$, $k=1,2,\ldots,K$ and $e$ is a tolerable error, then the two steps 302 and 303 converge.

When no convergence (304) is obtained the lower bound $\tau_{min}$ is updated 3040 such that: $\tau_{min}^{(n+1)} = \tau^{(n)}$ Once convergence 304 is obtained, the upper bound $\tau_{max}$ of the threshold is updated (305) such that: $\tau_{max}^{(n+1)} = \tau^{(n)}$.

Then, the absolute difference between the two threshold bounds is computed and compared (306) to a tolerable error $\rho$. If $|\tau_{max}^{(n)} - \tau_{min}^{(n)}| \leq \rho$ the obtaining of the first layer precoding matrix $F_j = U_j^{(n)}$, $\forall j$ ends, else the next iteration with n=n+1 is performed (307) by returning to the step 302 for determining (302) at least one eigen-vector of said first layer precoding matrix.

Said computations are performed for $j=1,2,\ldots,L$ so that said central equipment delivers a vector F of L first layer precoding matrices for all L cells such that: $F=\{F_1 \ldots F_i \ldots F_j \ldots F_L\}$, i.e. one matrix per cell.

After obtaining said cell-layer precoding matrix $F_i$ with $F_i \in U^{M \times D_i}$ with $D_i$ the degree of spatial freedom for the i-th cell, the central node sends it to the i-th eNB, which receives (31) it can then obtain (321) the matrix $\overline{H}_i = F_i^H H_i$ as an effective channel where $H_i$ is a real time channel state information sends (3006) by each user equipment in the i-th cell at each time slot.

Previously, to the iterative determining 3002 of a second layer precoding matrix, an initialisation (320) is performed by said network equipment $eNB_i$. During said initialisation (320), the number of iterations of this determining 3002 of a second layer precoding matrix, is set to zero (p=0) and all the M values $q_{im}^{p=0}$ with $m=1,2,\ldots,M$, of a first Lagrange multiplier vector $q_i^{p=0}$ are also set to zero.

Then, considering an iteration p, with a fixed value of said first Lagrange multiplier $q_i^p = [q_{i,1}^p, q_{i,2}^p, \ldots, q_{i,M}^p]$, values $v_{ik}^p$ with $k=1,2,\ldots,K$ of a second optimal Lagrange multiplier $v_i^p$ are obtained by considering the following problem comprising two equations with two unknown values:

$$v_{ik}^{(p)} = \frac{1}{\left(1 + \frac{1}{\gamma_{ik}}\right) \overline{h_{i,ik}^H} [B_i^{(p)}]^{-1} \overline{h_{i,ik}}} \text{ with } k = 1, 2, \ldots, K \text{ and}$$

$$B_i^{(p)} = I + F_i^H Q_i F_i + \sum_{k=1}^{K} v_{ik}^{(p)} \overline{h_{i,ik}} \overline{h_{i,ik}^H}$$

with $v_{ik}^{(0)}=1, \forall k$ where $\gamma_{ik}$ is the SINR value for the considered k-th user equipment and $Q_i = \text{diag}(q_i^p)$.

Then, from said second layer Lagrange multiplier $v_{ik}^{(p)}$ associated with said second layer precoding, at least one vector $\overline{w_{ik}}$ associated with said second layer precoding matrix is obtained (323) as following:

$\widehat{w_{ik}} = [B_i^{(p)}]^{-1} \overline{h_{i,ik}}$, where $\widehat{w_{ik}}$ is the optimal uplink received vector for the k-th user equipment in the i-th cell.

Then, by using known relationship between uplink and downlink user-layer precoding vector for the k-th user equipment in the i-th cell is obtained as following:

$\overline{w_{ik}} \sqrt{\delta_{i,k}} \widehat{w_{ik}}$ where $\delta_{i,k}$ is given by
$[\delta_{i,1}, \delta_{i,2}, \ldots, \delta_{iK}]^T = T_i^{-1} \varepsilon_i$ with $\varepsilon_i = [\varepsilon_{i,1}, \varepsilon_{i,2}, \ldots, \varepsilon_{i,K}]^T$ and $\varepsilon_{i,K} = \sum_{j \neq i} \widehat{G_{j,ik}} + \sigma^2$, where $\sigma^2$ is the power of additive white Gaussian noise, $\widehat{G_{j,ik}}$ cell interference from the j-th eNB to the k-th user equipment in the i-th cell such that $\widehat{G_{j,ik}} = P_T tr(R_{i,jk} F_i F_i^H)$ as well as the elements of the matrix $T_i \in C^{K \times K}$ are given by:

$$[T_i]_{(c,d)} = \begin{cases} \frac{1}{\gamma_{ic}} |\widehat{w_{ic}}^H \overline{h_{i,ic}}|^2, & \text{if } c = d \\ -|\widehat{w_{ic}}^H \overline{h_{i,ic}}|^2, & \text{if } c \neq d \end{cases}$$

Then, using said at least one vector $(\overline{w_{ik}})$ associated with said second layer precoding matrix and said predetermined power value (Pant) associated with a single antenna of said user equipment (UE) a value of said first Lagrange multiplier associated with said second layer precoding is determined (324) for the next iteration using a subgradient projection with step size $t_i^{(p)}=[t_{i1}^{(p)}, t_{i2}^{(p)}, \ldots, t_{iM}^{(p)}]^T$:

$q_{im}^{(p+1)}=[q_{im}^{(p)}+t_{im}^{(p)}([\Sigma_{k=1}^K F_i \overline{w_{ik}} \overline{w_{ik}}^H F_i^H]_{m,m}-P_{ant})]^+$
with $m=1,2, \ldots M$ and where $P_{ant}$ is power constraint of a single antenna.

If convergence (325) is obtained, the user-layer precoding matrix $W_i=[w_{i1}, w_{iK}] \in \mathbb{C}^{D_i \times K}$ and power allocation scheme is obtained as following:

$$p_{ik} = \|\overline{w_{ik}}\|^2, w_{ik} = \frac{\overline{w_{ik}}}{\|\overline{w_{ik}}\|},$$

else p the number of iteration is incremented (326) and the steps (321, 322, 323, 324) of the determining 3002 of a second layer precoding matrix are reiterated until convergence (325).

As a consequence, the scheme proposed according to the present disclosure can minimize the total transmit power across all eNBs, which namely improves the system energy efficiency while guaranteeing the targeted SINR of each user equipment. Moreover, the power constraint of single antenna is considered, which improves the efficiency of power amplifier of each user equipment.

5.2.4 Results

FIG. 4A to 4C represent a comparison between the results obtained according to the present disclosure and the results obtained using the prior art techniques.

More precisely, FIG. 4A represents the average signal-to-interference-plus-noise ratio (SINR) of a user equipment as a function of an increasing number of transmit antennas per network equipment (eNB).

As can be seen the average downlink SINR per user equipment (UE) of the proposed scheme guarantees the target SINR (10 dB) compared with other schemes of the prior art including the cell ZF beamforming and the coordinated multipoint (CoMP) transmission.

FIG. 4B represents the downlink SINR of cell-edge User equipment, SINR of cell-edge User equipment being defined as the $5^{th}$ percentile point of a cumulative distribution function of the user equipment's SINR.

In comparison with the other two techniques of the prior art, the cell-edge user equipment SINR obtained according to the proposed method outperforms other schemes as the cell-layer precoder mitigates the inter-cell interference.

FIG. 4C represents the obtained energy efficiency according to the proposed scheme. It can be seen, that the present disclosure permits to reach an energy efficiency, which is slightly larger than the one obtained using the coordinated multipoint (CoMP) transmission. It has to be noted that in the cluster (CoMP) scheme, network equipments (eNBs) in the same cluster serve the same user equipment (UE), thus each eNB need less power compared to the proposed scheme.

However, the cluster (CoMP) scheme needs the instantaneous channel state information (like in the present disclosure), but also the data information of the target user equipments to be shared among the eNBs in the same cluster, which will consume overwhelming overhead resources compared to the proposed scheme, which does not require such data information.

5.3 Structure of the Network Equipment

Finally, FIG. 5 illustrates the simplified structure of network equipment (eNB) implementing or being used for implementing a method for transmitting a signal as described here above.

A network equipment, as illustrated in FIG. 5, comprises a memory 51 comprising a buffer memory, a processing unit 52 equipped for example with a microprocessor uP and driven by the computer program 53, implementing the method for performing for transmitting a signal according to the present disclosure.

At initialization, the code instructions of the computer program 53 are for example loaded into a RAM and then executed by the processor of the processing unit 52. The microprocessor of the processing unit 52 implements the steps of the method for transmitting a signal as described here above according to the computer program instructions 53.

To this end, the network equipment according to the present disclosure comprises, in addition to the buffer memory 51, a receiver, connected to a plurality of antennas, and configured to receive a first layer precoding matrix (F) obtained from long-term channel state information between a user equipment and said network equipment, a precoding module, connected to said receiver, and configured to determine a second layer precoding matrix (W) obtained from said first layer precoding matrix and from real-time channel state information ($H_i$) between said user equipment and said network equipment, a double-layer coordinated beamforming (V) module, connected to the receiver and to the precoding module, configured to combine said first layer precoding matrix (F) and said second layer precoding matrix (W), said double-layer coordinated beamforming (V) module, determining said second layer precoding matrix (W), being optimized by using a predetermined signal-to-interference-plus-noise ratio (SINR) of said signal, and/or a predetermined power value (Pant) associated with a single antenna of said user equipment (UE), as optimization parameters.

These means are driven by the microprocessor of the processing unit 52.

The invention claimed is:

1. A method of transmitting a signal carrying data from network equipment to user equipment in a multiple-input multiple-output communication system, the method comprising applying a double-layer coordinated beamforming of the data prior to their transmission to the user equipment; the double-layer coordinated beamforming comprising:

receiving a first layer precoding matrix obtained at least from long-term channel state information between the user equipment and the network equipment;

determining a second layer precoding matrix obtained from the first layer precoding matrix and from real-time channel state information between the user equipment and the network equipment; and obtaining the double-layer coordinated beamforming by combining the first layer precoding matrix and the second layer precoding matrix;

wherein determination of the second layer precoding matrix is optimized by using, in combination with the first layer precoding matrix, a predetermined signal-to-interference-plus-noise ratio of the signal, and/or a predetermined power value associated with a single antenna of the user equipment, as optimization parameters; and wherein determination of the second layer precoding matrix iterates according to the following:

with a fixed value of a first Lagrange multiplier associated with the second layer precoding matrix, using the predetermined signal-to-interference-plus-noise ratio for optimizing a second layer Lagrange multiplier associated with the second layer precoding;

from the second layer Lagrange multiplier associated with the second layer precoding, obtaining at least one vector associated with the second layer precoding matrix; and using the at least one vector associated with the second layer precoding matrix and the predetermined power value associated with a single antenna of the user equipment for determining, for the next iteration, a value of the first Lagrange multiplier associated with the second layer precoding.

2. The method according to claim 1, wherein the real-time channel state information is obtained at each time slot.

3. The method according to claim 1, wherein the value of the first Lagrange multiplier associated with the second layer precoding matrix is determined by using a second layer precoding sub-gradient projection.

4. Network equipment for transmitting a signal carrying data to user equipment in a multiple input-multiple output communication system, the network equipment being configured to perform a double-layer coordinated beamforming of the data prior to their transmission to the user equipment; the network equipment comprising:

a receiver, connected to a plurality of antennas, and configured to receive a first layer precoding matrix obtained from long-term channel state information between the user equipment and the network equipment;

a precoder, connected to the receiver, and configured to determine a second layer precoding matrix obtained from the first layer precoding matrix and from real-time channel state information between the user equipment and the network equipment; and a double-layer coordinated beamformer, connected to the receiver and to the precoder, configured to combine the first layer precoding matrix and the second layer precoding matrix;

wherein the double-layer coordinated beamformer, is configured to optimize determination of the second layer precoding by using, in combination with the first layer precoding matrix, a predetermined signal-to-interference-plus-noise ratio of the signal, and/or a predetermined power value associated with a single antenna of the user equipment, as optimization parameters; and wherein the network equipment is configured to iteratively determine the second layer precoding matrix by:

with a fixed value of a first Lagrange multiplier associated with the second layer precoding matrix, using the predetermined signal-to-interference-plus-noise ratio for optimizing a second layer Lagrange multiplier associated with the second layer precoding;

from the second layer Lagrange multiplier associated with the second layer precoding, obtaining at least one vector associated with the second layer precoding matrix; and using the at least one vector associated with the second layer precoding matrix and the predetermined power value associated with a single antenna of the user equipment for determining, for the next iteration, a value of the first Lagrange multiplier associated with the second layer precoding.

5. A multiple input-multiple output communication system comprising:

at least one network equipment according to claim 4;

at least one user equipment comprising a single antenna; and central equipment configured to determine a first layer precoding matrix from at least long-term channel state information between the at least one user equipment and the at least one network equipment.

6. The multiple input-multiple output communication system according to claim 5, wherein the central equipment is configured to iteratively obtain the first layer precoding matrix, by, for each iteration:

determining at least one eigen-vector of the first layer precoding matrix, from the long-term channel state information and two first layer precoding Lagrange multipliers, and determining a value for each of the two first layer precoding Lagrange multipliers for the next iteration, the determination being implemented until convergence;

determining at least one threshold value for the next iteration, the determination of the at least one threshold value being implemented once convergence is reached; and comparing the at least one threshold value with a value representing a tolerable error.

7. The multiple input-multiple output communication system according to claim 6, wherein the system is configured to determine a value for each of the two first layer precoding Lagrange multipliers for the next iteration by performing a first layer precoding sub-gradient projection obtaining simultaneously the two first layer precoding Lagrange multipliers.

8. The multiple input-multiple output communication system according to claim 6, wherein the central equipment is configured to initialize the threshold as a mean of a lower bound and an upper bound of inter-cell interference, the upper bound being proportional to a predetermined power value associated with a single antenna of the user equipment.

9. A non-transitory computer readable medium having stored thereon instructions for implementing a method of transmitting a signal carrying data when the instructions are executed by a processor in network equipment, wherein the method comprises:

applying a double-layer coordinated beamforming of the data prior to their transmission to user equipment; the double-layer coordinated beamforming comprising:

receiving a first layer precoding matrix obtained at least from long-term channel state information between the user equipment and the network equipment;

determining a second layer precoding matrix obtained from the first layer precoding matrix and from real-time channel state information between the user equipment and the network equipment; and obtaining the double-layer coordinated beamforming by combining the first layer precoding matrix and the second layer precoding matrix;

wherein determination of the second layer precoding matrix is optimized by using, in combination with the first layer precoding matrix, a predetermined signal-to-interference-plus-noise ratio of the signal, and/or a predetermined power value associated with a single antenna of the user equipment, as optimization parameters;

wherein determination of the second layer precoding matrix iterates according to the following:

with a fixed value of a first Lagrange multiplier associated with the second layer precoding matrix, using the predetermined signal-to-interference-plus-noise ratio for optimizing a second layer Lagrange multiplier associated with the second layer precoding;

from the second layer Lagrange multiplier associated with the second layer precoding, obtaining at least one vector associated with the second layer precoding matrix; and using the at least one vector associated with the second layer precoding matrix and the predetermined power value associated with a single antenna of the user equipment for determining, for the next iteration, a value of the first Lagrange multiplier associated with the second layer precoding.

* * * * *

UNITED STATES PATENT AND TRADEMARK OFFICE
CERTIFICATE OF CORRECTION

PATENT NO. : 10,666,329 B2  
APPLICATION NO. : 15/385839  
DATED : May 26, 2020  
INVENTOR(S) : Wang et al.

Page 1 of 3

It is certified that error appears in the above-identified patent and that said Letters Patent is hereby corrected as shown below:

On the Title Page

In Column 1, Item (54), Title, Lines 1-2, delete "BEAM FORMING" and insert -- BEAMFORMING --.

In Column 2, Item (56), Other Publications, Line 1, delete "Oostnejad" and insert -- Doostnejad --.

On page 2, in Column 2, Item (56), Other Publications, Line 7, delete "Applicatn" and insert -- Application --.

On page 2, in Column 2, Item (56), Other Publications, Line 11, delete "Applicat's" and insert -- Applicant's --.

On page 2, in Column 2, Item (56), Other Publications, Line 34-36, delete "International Search Report and Written Opinion of the International Searching Authority dated Sep. 8. 2016 for International Applicatin No. PCT/CN2015/098047 filed Dec. 21, 2015, 157 pages.".

On page 2, in Column 2, Item (56), Other Publications, Line 40, delete "Technolgy" and insert -- Technology --.

In the Specification

In Column 1, Lines 1-2, delete "BEAM FORMING" and insert -- BEAMFORMING --.

In Column 2, Lines 36-37, delete "multiple input-multiple output" and insert -- multiple-input multiple-output --.

In Column 2, Line 50, delete "and" and insert -- and the network equipment, --.

Signed and Sealed this  
Third Day of November, 2020

Andrei Iancu  
*Director of the United States Patent and Trademark Office*

CERTIFICATE OF CORRECTION (continued)
U.S. Pat. No. 10,666,329 B2

In Column 3, Line 16, delete "signal-to interference-plus-noise" and insert -- signal-to-interference-plus-noise, --.

In Column 5, Line 29, delete "M IMO" and insert -- MIMO --.

In Column 6, Line 30, delete "the" and insert -- The --.

In Column 7, Line 11 (approx.), delete "$h_{i,j} = R_{i,jk}^{1/2} \widetilde{h}_{i,jk}$," and insert -- $h_{i,jk} = R_{i,jk}^{1/2} \widetilde{h}_{i,jk}$, --.

In Column 8, Line 12, delete "$R_{j,jk}$" and insert -- $R_{i,jk}$ --.

In Column 8, Line 54, delete "$\tau_{min}^{(n=O)}$" and insert -- $\tau_{min}^{(n=0)} = 0$ --.

In Column 8, Line 55, delete "$\tau_{max}^{(n=0)} \tau_{min}^{(n=0)}$." and insert -- $\tau_{max}^{(n=0)} > \tau_{min}^{(n=0)}$. --.

In Column 9, Line 14 (approx.), delete "$X=\{X_1, \ldots, X_K\}$." and insert -- $X = \{X_1, \ldots, X_K\}$. --.

In Column 9, Line 43, delete "$\mu_j^{(n+1)} = (\mu_j^{(n)} - \theta^{(n)} \cdot [rt(X_j^*) - \alpha K])^+$," and insert -- $\mu_j^{(n+1)} = \left(\mu_j^{(n)} - \theta^{(n)} \cdot [tr(X_j^*) - \alpha K]\right)^+$, --.

In Column 9, Line 50, delete "precisely," and insert -- precisely, if --.

In Column 10, Line 2, delete "it-th" and insert -- i-th --.

In Column 10, Line 4, delete "$\overline{H}_i = F_i^H H_i$" and insert -- $\overline{H}_i = F_i^H H_i$ --.

In Column 10, Lines 24-27, delete "$v_{ik}^{(p)} = \dfrac{1}{\left(1 + \frac{1}{\gamma_{ik}}\right) \overline{h}_{i,k}^H [B_i^{(p)}]^{-1} \overline{h}_{i,k}}$" and insert -- $v_{ik}^{(p)} = \dfrac{1}{(1+\frac{1}{\gamma_{ik}}) \overline{h}_{i,k}^H [B_i^{(p)}]^{-1} \overline{h}_{i,k}}$ --.

In Column 10, Line 47, delete "$\overline{w}_{ik} \sqrt{\delta_{i,k}} \widehat{w}_{ik}$" and insert -- $\overline{w}_{ik} = \sqrt{\delta_{i,k}} \widehat{w}_{ik}$ --.

In Column 10, Line 50, delete "$\varepsilon_{i,K} = \sum_{j \neq i} \widehat{G}_{j,k} + \sigma^2$," and insert $$\varepsilon_{i,K} = \sum_{j \neq i} \widehat{G_{i,jk}} + \sigma^2,$$

In Column 10, Line 51, delete "$\widehat{G_{j,k}}$" and insert -- $\widehat{G_{i,jk}}$ --.

In Column 12, Line 3, delete "uP" and insert -- μP --.

In the Claims

In Column 13, Line 21, Claim 4, delete "multiple input-multiple output" and insert -- multiple-input multiple-output --.

In Column 13, Line 66, Claim 5, delete "multiple input-multiple output" and insert -- multiple-input multiple-output --.

In Column 14, Line 8, Claim 6, delete "multiple input-multiple output" and insert -- multiple-input multiple-output --.

In Column 14, Line 25, Claim 7, delete "multiple input-multiple output" and insert -- multiple-input multiple-output --.

In Column 14, Line 32, Claim 8, delete "multiple input-multiple output" and insert -- multiple-input multiple-output --.